US008318302B2

(12) United States Patent
Gervasi et al.

(10) Patent No.: US 8,318,302 B2
(45) Date of Patent: Nov. 27, 2012

(54) FUSER MEMBER RELEASE LAYER HAVING NANO-SIZE COPPER METAL PARTICLES

(75) Inventors: David J Gervasi, Pittsford, NY (US); Santokh S Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 678 days.

(21) Appl. No.: 12/046,596

(22) Filed: Mar. 12, 2008

(65) Prior Publication Data

US 2009/0233085 A1 Sep. 17, 2009

(51) Int. Cl.
*B32B 5/16* (2006.01)

(52) U.S. Cl. ......................... 428/328; 428/323; 428/447

(58) Field of Classification Search .................. 428/328, 428/323, 447

See application file for complete search history.

(56) References Cited

U.S. PATENT DOCUMENTS 4,029,827 A * 6/1977 Imperial et al. .......... 430/124.37
4,101,686 A 7/1978 Strella et al.
4,185,140 A 1/1980 Strella et al.
4,257,699 A 3/1981 Lentz
4,935,785 A 6/1990 Wildi et al.
5,017,432 A 5/1991 Eddy et al.
5,061,965 A 10/1991 Ferguson et al.
5,157,445 A 10/1992 Shoji et al.
5,166,031 A 11/1992 Badesha et al.
5,281,506 A 1/1994 Badesha et al.
5,366,772 A 11/1994 Badesha et al.
5,370,931 A 12/1994 Fratangelo et al.
5,395,725 A 3/1995 Bluett et al.
5,698,320 A 12/1997 Ebisu et al.
5,716,747 A 2/1998 Uneme et al.
5,729,813 A 3/1998 Eddy et al.
5,933,695 A 8/1999 Henry et al.
6,183,929 B1 2/2001 Chow et al.
6,514,650 B1 2/2003 Schlueter, Jr. et al.
7,291,399 B2 11/2007 Kaplan et al.
2004/0091715 A1* 5/2004 Pickering et al. ............. 428/421
2005/0048294 A1* 3/2005 Kaplan et al. ................. 428/447
2006/0177758 A1* 8/2006 Bluett et al. .................. 430/124

OTHER PUBLICATIONS

Cupric oxide data sheet downloaded from http://www.jtbaker.com/msds/englishhtml/C5885.htm on Dec. 6, 2010.*
Fluoropolymer Comparison—Typical Properties downloaded on Dec. 6, 2010 from http://www2.dupont.com/Teflon_Industrial/en_US/tech_info/techinfo_compare.html?src=ptfe-density.*
VITON selection guide downloaded on Dec. 6, 2010 from http://www.dupontelastomers.com/literature/viton/D649A976F24C3F78E82E7900D3712585.pdf.*
GP-506 Mercapto Terminated Silicone Fluid download on Dec. 6, 2010 from http://www.gpcsilicones.com/fluids/mercaptofunc/gp506.html.*
XEROX fuser agent MSDS, downloaded on Mar. 26, 2012 from http://www.hss.doe.gov/sesa/corporatesafety/feosh/docs/XEROX 5065FuserAgentMSDS.pdf.*

* cited by examiner

*Primary Examiner* — Elizabeth A Robinson
(74) *Attorney, Agent, or Firm* — MH2 Technology Law Group LLP

(57) ABSTRACT

A fuser member having a substrate; an outer polymeric layer including a fluoropolymer having nano-size copper metal particles dispersed therein, wherein the nano-size copper metal particles have a particle size of from about 50 to about 1,500 nm; and a release agent material coating on the outer polymeric layer, wherein the release agent material coating has a mercapto functional release agent, and wherein from about 85 to about 100 percent of the outer polymeric layer is covered with the mercapto functional release agent.

12 Claims, 3 Drawing Sheets

FUSER MEMBER RELEASE LAYER HAVING NANO-SIZE COPPER METAL PARTICLES

BACKGROUND

Herein is disclosed fuser members useful in electrostatographic reproducing apparatuses, including digital, image on image, and contact electrostatic printing and copying apparatuses. The present fuser members may be used as fuser members, pressure members, transfuse or transfix members, and the like. In an embodiment, the fuser members comprise an outer layer comprising a polymer and having thereon, a liquid release agent. In embodiments, the release agent is a mercapto-functional release agent. In embodiments, the outer layer of the fuser member comprises nano-size copper metal particles that react with the mercapto functional liquid release agent.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It may be undesirable to increase the temperature of the substrate substantially higher than about 250° C., because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

U.S. Pat. No. 4,029,827 discloses the use of polyorganosiloxanes having mercapto functionality as release agents.

U.S. Pat. No. 4,101,686 to Strella et al. and U.S. Pat. No. 4,185,140 also to Strella et al., both disclose polymeric release agents having functional groups such as carboxy, hydroxy, epoxy, amino, isocyanate, thioether, or mercapto groups.

U.S. Pat. No. 4,935,785 to Wildi et al. discloses a process for fusing, wherein copper or copper oxide can be used as a resistive material.

U.S. Pat. No. 5,157,445 to Shoji et al. discloses toner release oil having a functional organopolysiloxane of a certain formula.

U.S. Pat. No. 5,370,931 to Fratangelo et al. discloses a fuser member having a volume graft outer layer having copper oxide dispersed therein.

U.S. Pat. No. 5,395,725 to Bluett et al. discloses a release agent blend composition wherein volatile emissions arising from the fuser release agent oil blend are reduced or eliminated.

U.S. Pat. No. 5,698,320 discloses the use of fluorosilicone polymers for use on fixing rollers with outermost layers of perfluoroalkoxy and tetrafluoroethylene resins.

U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer.

U.S. Pat. No. 5,729,813 to Eddy et al. discloses a fuser member having an outer fluoroelastomer and alumina layer, the outer layer may further include not more than 30 parts by weight copper oxide.

U.S. Pat. No. 5,933,695 to Henry et al. discloses a rapid wake-up fuser member having an outer release layer, which can contain copper oxide therein.

U.S. Pat. No. 6,183,929 B1 to Chow et al. discloses a release agent comprising (a) an organosiloxane polymer containing amino-substituted or mercapto-substituted organosiloxane polymers, wherein the amino or mercapto functional groups on at least some of the polymer molecules having a degree of functionality of from about 0.2 to about 5 mole percent, and (b) a nonfunctional organosiloxane polymer having a viscosity of from about 100 to about 2,000 centistrokes, and wherein the mixture has a degree of functionality of from about 0.05 to about 0.4 mole percent.

U.S. Pat. No. 6,514,650 to Schlueter et al. discloses an electrostatic component having an outer layer having a perfluoroelastomer and copper oxide.

U.S. Pat. No. 7,291,399 discloses a fuser member having an outer fluoropolymer layer having copper oxide dispersed therein, and a release agent containing both of amino- and mercapto-functionalities.

The use of polymeric release agents having functional groups, which interact with a fuser member to form a thermally stable, renewable self-cleaning layer having good release properties for electroscopic thermoplastic resin toners, is described in U.S. Pat. No. 4,029,827.

Mercapto-functional polydimethylsiloxane fluid is currently used in fuser subsystems as a release agent. The mercapto functional groups bond to fluoroelastomers and other substrates by way of coordination with particulate filler in the release layer material. Copper oxide is the most common example of a filler that provides a suitable bonding site for functional fluids. Lead oxide and zinc oxide are other known examples. While this release mechanism is useful in monochrome xerographic platforms, release layers loaded with conventional fillers do not provide sufficient release for high speed monochrome or color xerographic marking fusers, where toner coverage is higher and oil bonding sites on the surface of the fuser are limited. Amine-functional fluids provide sufficient coverage of the fuser member, but also adhere to paper surfaces, causing many problems in post-fusing operations such as book binding, post fuser adhesion and MICR printing. These post-fusing issues associated with the use of amine-functional fuser fluid make it attractive to use mercapto, or other functional silicone release fluids that do not react with and adhere to paper surfaces. Specifically, 3M Post-It notes are not always able to attach to the resulting paper due to the presence of amino-functional oil on the final copy or print substrate. Adding metal oxides and metal particles has been explored in fusing subsystems in the past, but the sizes of the of these particles have been micron-sized, rather than nano-sized. Therefore, an alternate to amino oil for high speed color fusing would be highly desirable to address fuser life and post fusing issues.

Therefore, it is desired to provide a combination of fuser coating and fusing oil which provides for desired physical properties such as thermal conductivity, and release performance of the resulting fuser topcoat, increases fuser life, and decreases the occurrence of hot offset. It is further desired to provide a combination of functional oil that provides adequate coverage for color xerographic marking and avoids the many post-fuse issues associated with the use of amine-functional fuser fluids. It is also desired to provide a fuser oil system that has adequate coverage for use in high speed monochrome, color and MICR-type electrostatographic apparatuses.

SUMMARY

Embodiments herein include a fuser member comprising: a substrate; an outer polymeric layer comprising a fluoropolymer having nano-size copper metal particles dispersed therein, wherein the nano-size copper metal particles have an average particle diameter of from about 50 to about 1,500 nm; and a release agent material coating on the outer polymeric layer, wherein the release agent material coating comprises a mercapto functional release agent, and wherein from about 85 to about 100 percent of the outer polymeric layer is covered with said mercapto functional release agent.

Embodiments further include a fuser member comprising: a substrate; an outer polymeric layer comprising a fluoroelastomer; and having nano-size copper metal particles dispersed therein, wherein the nano-size copper metal particles have a particle size of from about 50 to about 500 nm; and a release agent material coating on the outer polymeric layer, wherein the release agent material coating comprises a mercapto functional release agent, and wherein from about 85 to about 100 percent of the outer polymeric layer is covered with said mercapto functional release agent.

Embodiments also include an image forming apparatus for forming images on a recording medium comprising: a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises: a substrate; an outer polymeric layer comprising a fluoropolymer having nano-size copper metal particles dispersed therein, wherein the nano-size copper metal particles have a particle size of from about 50 to about 1,500 nm; and a release agent material coating on the outer polymeric layer, wherein the release agent material coating comprises a mercapto functional release agent, and wherein from about 85 to about 100 percent of the outer polymeric layer is covered with said mercapto functional release agent.

BRIEF DESCRIPTION OF THE DRAWINGS

For a better understanding of the present invention, reference may be had to the accompanying figures.

DETAILED DESCRIPTION

Disclosed herein is the addition of nano-sized copper metal particles to a fluoroelastomer, or other elastomer or composite polymer coating formulation. Upon crosslinking of the deposited coating, the copper nano-size particles will be incorporated into the fluoroelastomer polymer system. The purpose of this copper nano-particle distributed into the fluoroelastomer system is to form a release layer on a fuser member that can be used in conjunction with a mercapto functional polydimethylsiloxane release fluid in color fusing applications. The added metal particles enhance the physical properties and release performance of the resulting fuser topcoat. The integration of copper oxide at a finer level in a fluoroelastomer release coating allows for an increased number and a more even distribution of potential bonding sites over large particle copper oxide. The greater number and finer distribution provide enhanced release fluid coverage as well as improved wear and physical properties. The use of a more evenly distributed bonding site for the functional oil provides adequate coverage for color xerographic marking and avoid the many post-fuse issues associated with the use of amine-functional fuser fluids. An increase in the potential bonding sites at the surface and throughout the bulk of the release layer should improve fuser roll life, thermal conductivity and release performance.

Figure 1:
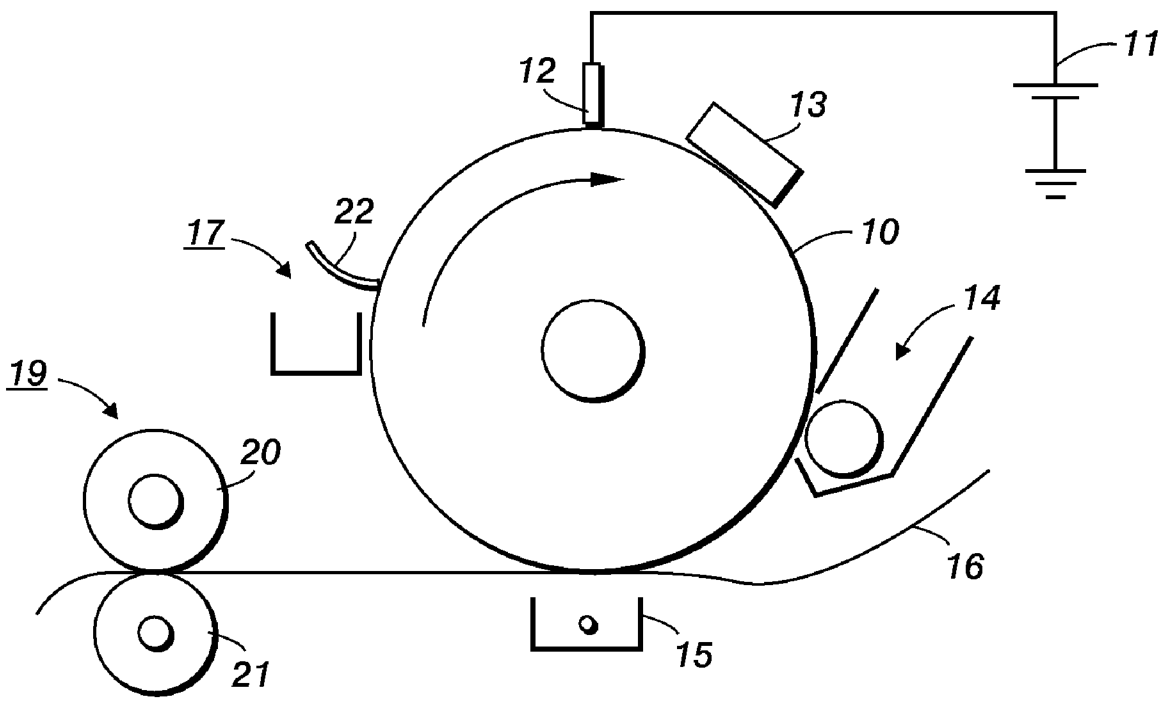
FIG. 1 is a schematic illustration of an image apparatus in accordance with embodiments herein.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
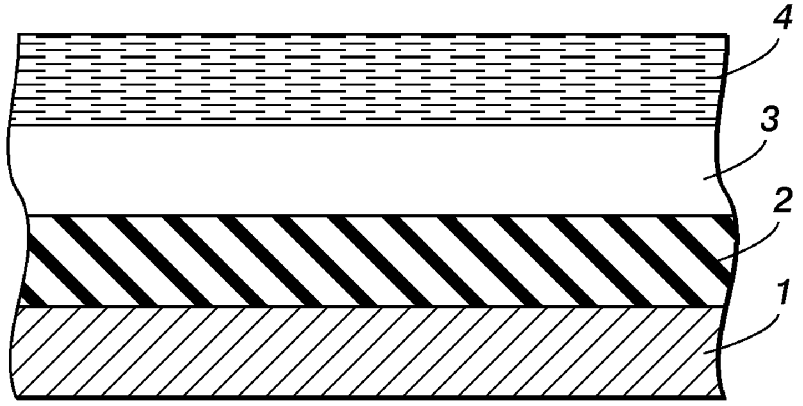
FIG. 2 is an enlarged, side view of an embodiment of a fuser member, showing a fuser member with a substrate, intermediate layer, outer layer, and release agent coating layer.

FIG. 2 is an enlarged schematic view of an embodiment of a fuser member, demonstrating the various possible layers. As shown in FIG. 2, substrate 1 has an optional intermediate layer 2 thereon. Intermediate layer 2 can be, for example, a rubber such as silicone rubber or other suitable material. On optional intermediate layer 2 is positioned outer layer 3, which comprises a polymer such as those described below. Positioned on outer layer 3 is outermost liquid amino-functional siloxane release layer 4.

Examples of the outer surface polymers of the fuser system members include fluoropolymers such as fluoroelastomers and hydrofluoroelastomers.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of two vinylidenefluoride and hexafluoropropylene (known commercially as VITON® A); 2) terpolymers of vinylidenefluoride, hexafluoropropylene and tetrafluoroethylene (known commercially as VITON® B); and 3) tetrapolymers of vinylidenefluoride, hexafluoropropylene, tetrafluoroethylene and cure site monomer (known commercially as VITON® GH and VITON® GF). Examples of commercially available fluoroelastomers include those sold under various designations such as VITON® A, VITON® B, VITON® E, VITON® E60C, VITON® E430, VITON® 910, VITON® GH; VITON® GF; and VITON® ETP. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer. These listed are commercially available from DuPont. The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene with about 2 weight percent cure site monomer.

Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly (propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

Examples of other fluoropolymers include fluoroplastics or fluoropolymers such as polytetrafluoroethylene, fluorinated ethylene propylene resin, perfluoroalkoxy, and other TEFLON®-like materials, and polymers thereof.

The amount of fluoroelastomer in solution in the outer layer solution, in weight percent of total solids, is from about 10 to about 25 percent, or from about 16 to about 22 percent by weight of total solids. Total solids as used herein include the amount of polymer, dehydrofluorinating agent (if present) and optional adjuvants, additives, and fillers.

Known and commercially available copper oxide particles have an average particle diameter of about 1 to 20 microns. However, the nano-size copper metal is much smaller. The nano-size copper metal particles have an average particle diameter of from about 50 to about 1,500 nm, or from about 50 to about 1,000 nm, or from about 50 to about 500 nm, or from about 50 to about 300 nm. The nano-size copper metal can be present in the outer fluoroelastomer layer in an amount of from about 1 to about 25, or from about 2 to about 15, or from about 5 to about 8 percent by weight of total solids. In addition, the copper may also be in needle or flake form. Flakes have a thickness of from about 2 to about 10 nm, or from about 4 to about 8 nm, and surface lengths of from about 1 to about 50 microns, or from about 1 to about 40 microns. Needles have from about 5 to about 20 micron lengths, or from about 8 to about 18 micron lengths, with from about 50 to about 400 nm, or from about 55 to about 320 nm thickness.

The thickness of the outer polymeric surface layer of the fuser member herein is from about 10 to about 250 micrometers, or from about 15 to about 100 micrometers.

Optional intermediate adhesive layers and/or intermediate polymer or elastomer layers may be applied to achieve desired properties and performance objectives of the present invention. The intermediate layer may be present between the substrate and the outer polymeric surface. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. An adhesive intermediate layer may be selected from, for example, epoxy resins and polysiloxanes.

There may be provided an adhesive layer between the substrate and the intermediate layer. There may also be an adhesive layer between the intermediate layer and the outer layer. In the absence of an intermediate layer, the polymeric outer layer may be bonded to the substrate via an adhesive layer.

The thickness of the intermediate layer is from about 0.5 to about 20 mm, or from about 1 to about 5 mm.

The release agents or fusing oils described herein are provided onto the outer layer of the fuser member via a delivery mechanism such as a delivery roll. The delivery roll is partially immersed in a sump, which houses the fuser oil or release agent. The mercapto-functional oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

Examples of suitable mercapto functional oils include the following:

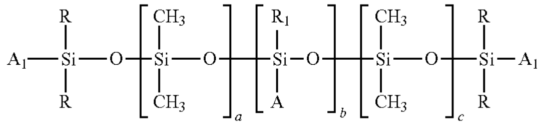

Where A can be $(CH_2)_nSH$, where n is from about 1 to about 20, or from about 2 to about 10, or from about 3 to about 5; $A_1$ is R or $(CH_2)_mSH$, where m is from about 1 to about 20, or from about 2 to about 10, or from about 3 to about 5; R is $(CH_2)_pCH_3$ where p is from about 0 to about 20, of from about 1 to about 10; $R_1$ is R or $(O—Si(CH_3)_2—O)_q—R$; and a+b+c+q is from about 50 to about 400, or from about 100 to about 300 or from about 200 to about 250. The functional percent of mercapto is from about 0.2 to about 2.0 weight percent, and is dictated by molecular weight if $A_1$ is mercapto functional, or by the ratio of b to a+c+q if $A_1$=R. For example, if $A_1$=R, and if a+c+q=99.8, b=0.2. Likewise, if $A_1$=R, and if a+c+q=98.0, b=2.0

The mercapto functional release agent has a viscosity of from about 100 to about 1,000, or from about 200 to about 800, or from about 300 to about 700, or from about 400 to about 700 cp, or from about 500 to about 600.

Figure 3:
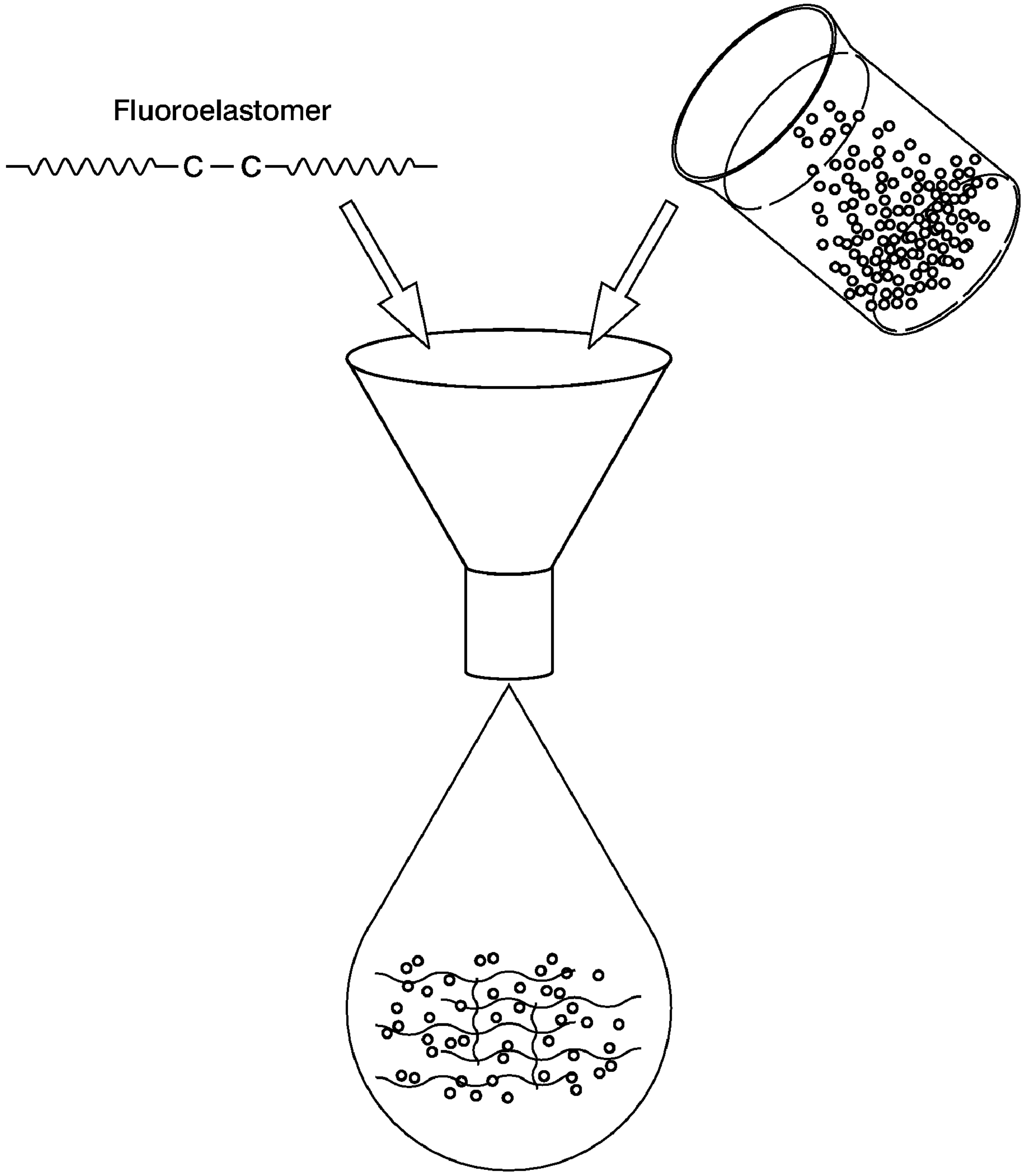
FIG. 3 is a schematic illustration of an embodiment of the process for producing the outer layer formulation.

FIG. 3 demonstrates the reaction scheme for the proposed polymer system. A fluoroelastomer is dissolved in a suitable solvent, such as MIBK (methyl isobutyl ketone, MEK (methyl ethyl ketone), and the like. Next, a dispersion of copper particles is formed by adding copper nano-particles to a formulation which contains a stabilizing agent, surfactant or coupling agent. The compositions described above are combined in a sufficient ratio to achieve a formulation having from about 1 to about 25 percent by weight of copper metal. The resulting formulation is blended with conventional additives and crosslinking chemicals and applied to a fuser member.

Examples of suitable stabilizing agents, surfactants and/or coupling agents can be in amounts of from about 0.5 to about 10, or from about 1 to about 7, or from about 2 to about 5 weight percent. Examples of stabilizing agents, surfactants and/or coupling agents or other additives include fluorinated surfactants such as FC4430 (manufactured by 3M); crosslinking agents such as bisphenol AF (VC-50, from Dupont Dow Elastomers) or aminoethyl aminopropyl trimethoxysilane (AO700 from United Chemical Technologies) both in amounts from about 2 to about 10, or from about 3 to about 7, or from about 4 to about 5 weight percent. Coupling agents include methoxy or ethoxy-functional silanes in an amount from about 1 to about 5, or from about 1 to about 3, or from about 1 to about 2 weight percent. Suitable examples include 3-glycidoxypropyl trimethoxysilane (G6720 from United Chemical Technology (UTC)) or 3-aminopropyl trimethoxy silane (AO800 from UCT) or (3,3,3-trifluoropropyl) trimethoxysilane (T2847 from UCT). Crosslinking of the metal particles and fluoroelastomer outer coating can be achieved using crosslinking agents as described herein and in U.S. Pat. No. 7,294,377, the subject matter of which is hereby incorporated by reference in its entirety.

The mercapto functional fluid bonds to the nano-size copper to create improved coverage on the fuser member. The coverage of the mercapto fluid is from about 85 to about 100 percent coverage, or from about 95 to about 100 percent coverage.

Figure 4:
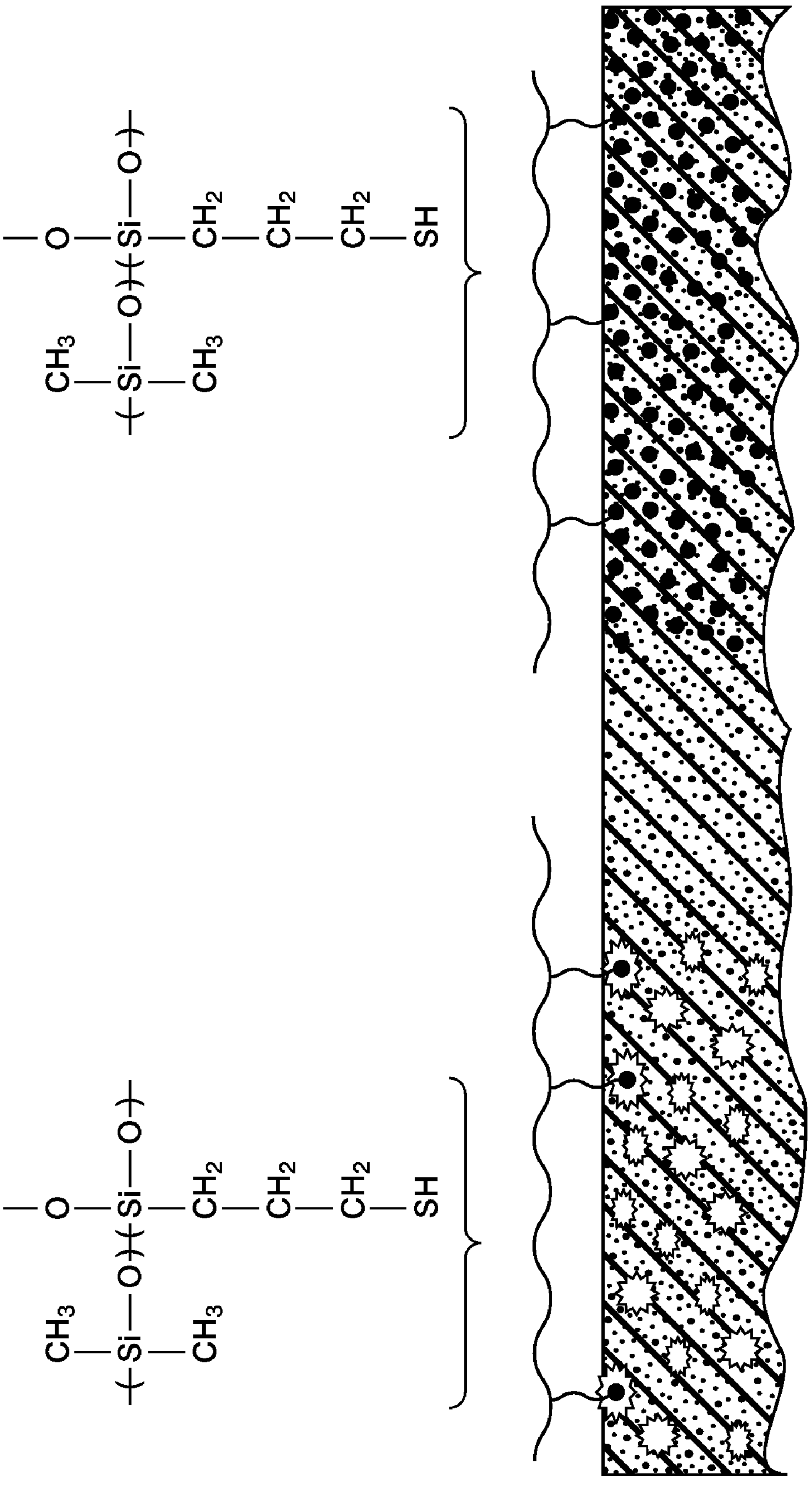
FIG. 4 is a schematic illustration of the reaction between conventional micron-sized copper oxide and mercapto-functional release agent as compared to the reaction between nano-size copper metal and mercapto-functional release agent.

FIG. 4 is a schematic illustration demonstrating mercapto-functional release agent bonded to conventional micron-sized copper oxide, compared to nano-size copper metal bonded to mercapto functional release agent. The left side of the FIG. 4 diagram represents the known employed copper oxide-mercapto bonding scheme. Conventional filler particles of copper oxide (CuO) ranging in size from about 1 to about 20 microns in diameter are added to the fluoroelastomer system via ball-milling or other dispersion process. The resulting material is coated onto a fuser member. The surface is ground, exposing the CuO surface, which acts as a bond receptor site for mercapto-functional PDMS (polydimethylsiloxane). The chemical reaction between the fluid and fuser surface enhances the release function of the fluid. But this reaction is limited by the availability of exposed CuO particles at the surface of the fuser material. The right side of FIG. 4 depicts the proposed polymer system. The molecular-level addition of a nano-particulate copper metal filler, provides available bond receptor sites at the surface to the material, as well as into the bulk. Since the copper is introduced at a much finer level and through an improved dispersion process, the copper distribution is higher, resulting in a higher probability of mercapto-copper oxide bonding at the fuser surface. This enables better release fluid coverage and leading to higher release life. The elimination of amine-functional PDMS as a release fluid also effectively mitigates the post-fuse issues associated with its use.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Formulation and Processing of Coating Containing Copper Nanopowder

A coating can be prepared by cast film or flow coating from solution onto a silicone roll, followed by curing and removal of the coating from the roll to obtain a free-standing film for evaluation of physical properties and dispersion of the copper metal nanopowder. A solution of VITON® GF (Dupont Dow Elastomers) or an equivalent polymer is dissolved in methyl isobutyl ketone (or MIK) to a 20% weight solids solution in a vessel suitable for ball milling, roll milling, or ball grinding. To this solution, 5% copper metal nanopowder by weight, 1% by weight of a surfactant, and milling media are added. All weight percentages are relative to the polymer weight. To this formulation, the equivalent of the curative package containing 5 pph VC-50, 1 pph MgO and 2 pph $Ca(OH)_2$ is added and placed on a ball mill for 30 minutes.

Example 2

Coating Fuser Member for Use in Electrophotographic Processes

A formulation as in Example 1 is coated onto a multi-layer fuser member by a flow-coating or spray process, and then cured. The multi-layer fuser member comprises a metal core, such as stainless steel or aluminum, onto which an adhesive layer is added. The outermost layer of the fuser member is a coating according to embodiments herein. The multi-layer roll is then used as a fuser member in an electrophotographic process.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A fuser member comprising:

a substrate;

an outer polymeric layer comprising a fluoropolymer and a plurality of copper metal particles dispersed therein, wherein the plurality of copper metal particles have an average particle diameter of from about 50 nm to about 500 nm, and the copper metal particles comprise elemental copper or oxides thereof; and a release agent material coating on the outer polymeric layer, wherein the release agent material coating consists of a mercapto functional release agent having the following formula:

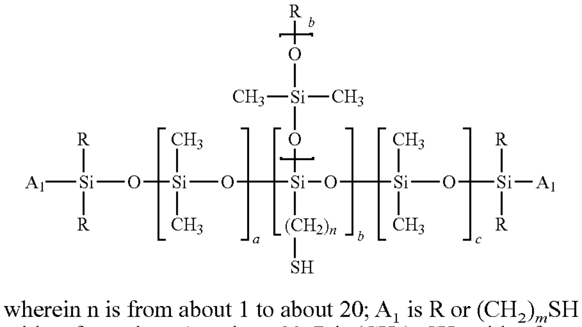

wherein n is from about 1 to about 20; $A_1$ is R or $(CH_2)_mSH$ with m from about 1 to about 20; R is $(CH_2)_pCH_3$ with p from about 0 to about 20; and a+b+c+q is from about 50 to about 400, and wherein from about 85 to about 100 percent of the outer polymeric layer is covered with said mercapto functional release agent, wherein a is at least 1 and q is at least 1.

2. A fuser member in accordance with claim 1, wherein the plurality of metal particles have an average particle size of from about 50 nm to about 300 nm.

3. A fuser member in accordance with claim 1, wherein said plurality of metal particles are present in the outer polymeric layer in an amount of from about 1 to about 25 percent by weight of total solids.

4. A fuser member in accordance with claim 1, wherein said fluoropolymer is a fluoroelastomer selected from the group consisting of a) copolymers of two of vinylidene fluoride, hexafluoropropylene, and tetrafluoroethylene, b) terpolymers of vinylidene fluoride, hexafluoropropylene, and tetrafluoroethylene, and c) tetrapolymers of vinylidene fluoride, hexafluoropropylene, tetrafluoroethylene, and a cure site monomer.

5. A fuser member in accordance with claim 4, wherein the fluoroelastomer comprises about 35 weight percent of vinylidenefluoride, about 34 weight percent of hexafluoropropylene, about 29 weight percent of tetrafluoroethylene, and about 2 weight percent cure site monomer.

6. A fuser member in accordance with claim 1, further comprising an intermediate layer positioned between the substrate and the outer polymeric layer.

7. A fuser member in accordance with claim 6, wherein said intermediate layer comprises silicone rubber.

8. A fuser member comprising:

a substrate;

an outer polymeric layer comprising a fluoropolymer and a plurality of copper metal particles dispersed therein, wherein each copper metal particle of the plurality of copper metal particles has a flake shape, wherein said each copper metal particle with a flake shape has a surface length of from about 1 to about 50 microns, and a thickness of from about 2 to about 10 nm, and the copper metal particles comprise elemental copper or oxides thereof; and a release agent material coating on the outer polymeric layer, wherein the release agent material coating consists of a mercapto functional release agent having the following formula:

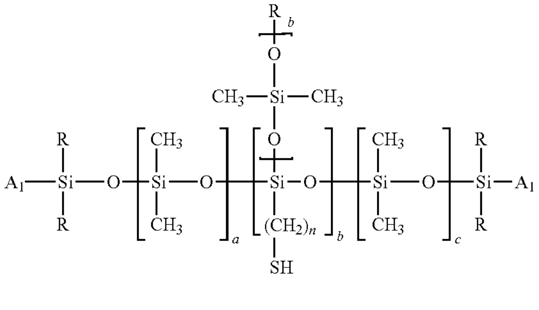

wherein n is from about 1 to about 20; $A_1$ is R or $(CH_2)_mSH$ with m from about 1 to about 20; R is $(CH_2)_pCH_3$ with from about 0 to about 20; and a+b+c+q is from about 50 to about 400, and wherein from about 85 to about 100 percent of the outer polymeric layer is covered with said mercapto functional release agent, wherein a is at least 1 and q is at least 1.

9. A fuser member in accordance with claim 7, wherein said each copper metal particle with a flake shape has a surface length of from about 1 to about 40 microns, and a thickness of from about 4 to about 8 nm.

10. A fuser member comprising:

a substrate;

an outer polymeric layer comprising a fluoropolymer and a plurality of copper metal particles dispersed therein, wherein each copper metal particle of the plurality of copper metal particles has a needle shape, said particles having a length of from about 5 to about 20 micron lengths, and a thickness of from about 50 to about 400 nm, and the copper metal particles comprise elemental copper or oxides thereof; and a release agent material coating on the outer polymeric layer, wherein the release agent material coating consists of a mercapto functional release agent having the following formula:

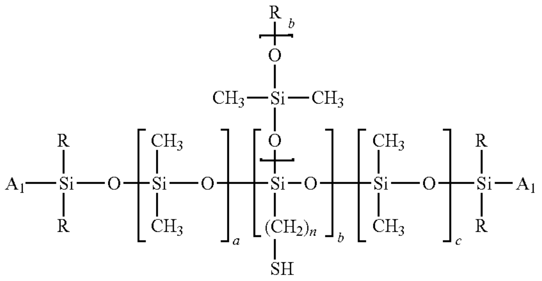

wherein n is from about 1 to about 20; $A_1$ is R or $(CH_2)_mSH$ with m from about 1 to about 20; R is $(CH_2)_pCH_3$ with from about 0 to about 20; and a+b+c+q is from about 50 to about 400, and wherein from about 85 to about 100 percent of the outer polymeric layer is covered with said mercapto functional release agent, wherein a is at least 1 and q is at least 1.

11. A fuser member in accordance with claim 10, wherein said nano-size copper metal particles have a needle shape, said particles having a length of from about 8 to about 18 micron lengths, and a thickness of from about 55 to about 320 nm.

12. An image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member component to fuse the transferred developed image to the copy substrate, wherein the fuser member comprises:

a substrate;

an outer polymeric layer comprising a fluoropolymer and a plurality of copper metal particles dispersed therein, wherein the plurality of copper metal particles have an average particle diameter of from about 50 nm to about 500 nm, and the copper metal particles comprise elemental copper or oxides thereof; and a release agent material coating on the outer polymeric layer, wherein the release agent material coating consists of a mercapto functional release agent having the following formula:

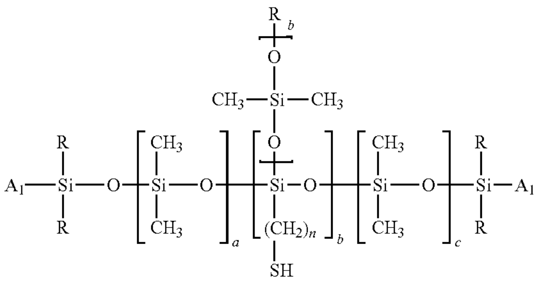

wherein n is from about 1 to about 20; $A_1$ is R or $(CH_2)_mSH$ with m from about 1 to about 20; R is $(CH_2)_pCH_3$ with p from about 0 to about 20; and a+b+c+q is from about 50 to about 400, and wherein from about 85 to about 100 percent of the outer polymeric layer is covered with said mercapto functional release agent, wherein a is at least 1 and q is at least 1.

* * * * *